(12) United States Patent
Akkerman et al.

(10) Patent No.: US 12,458,235 B2
(45) Date of Patent: Nov. 4, 2025

(54) SPATIAL FREQUENCY DOMAIN IMAGING SYSTEM AND METHOD

(71) Applicant: Nederlandse Organisatie voor toegepast-natuurwetenschappelijk onderzoek TNO, 's-Gravenhage (NL)

(72) Inventors: Hylke Broer Akkerman, Rosmalen (NL); Michiel Peter Oderwald, Delft (NL); Arjen Amelink, Gouda (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/832,185

(22) PCT Filed: Jan. 25, 2023

(86) PCT No.: PCT/NL2023/050031
§ 371 (c)(1),
(2) Date: Jul. 23, 2024

(87) PCT Pub. No.: WO2023/146395
PCT Pub. Date: Aug. 3, 2023

(65) Prior Publication Data
US 2025/0143578 A1     May 8, 2025

(30) Foreign Application Priority Data

Jan. 25, 2022   (EP) .................................... 22153153

(51) Int. Cl.
*A61B 5/00*     (2006.01)

(52) U.S. Cl.
CPC .......... *A61B 5/0077* (2013.01); *A61B 5/0033* (2013.01); *A61B 5/6801* (2013.01); *A61B 5/6802* (2013.01); *A61B 5/6853* (2013.01)

(58) Field of Classification Search
CPC ................ A61B 5/0033; A61B 5/0077; G01N 2021/4709; G01N 21/474;
(Continued)

(56) References Cited

U.S. PATENT DOCUMENTS

| 10,438,346 | B2 | 10/2019 | Nadeau et al. |
| 2003/0184757 | A1 | 10/2003 | Bevilacqua et al. |

(Continued)

FOREIGN PATENT DOCUMENTS

| CN | 102883658 A | 1/2013 |
| CN | 107205624 B | 8/2019 |

(Continued)

OTHER PUBLICATIONS

European Patent Office, International Search Report in corresponding International Application No. PCT/NL2023/050031 dated Mar. 20, 2023.

(Continued)

*Primary Examiner* — Amelie R Davis
(74) *Attorney, Agent, or Firm* — Leydig, Voit & Mayer, Ltd.

(57) ABSTRACT

A system and method for contact-based spatial frequency domain imaging. A medium to be imaged is contacted by a sheet comprising an array of lighting elements generating illumination light patterns illuminating the medium, and comprising an array of sensor elements measuring spatially resolved images of resulting light patterns reflected back after interaction of the illumination light patterns with the medium. The lighting elements generate illumination light patterns that are spatially modulated in light intensity along a surface of the illuminated medium according to a respective different spatial frequency. A set of spatially modulated images is determined based on the measured resulting light patterns caused by the different illumination light patterns.

(Continued)

An image of the medium can be generated based on a combination of the spatially modulated images.

20 Claims, 3 Drawing Sheets

(58) Field of Classification Search
CPC ... G01N 2201/0221; G01N 2201/0626; G01N 2201/0633; G01N 2201/0691
See application file for complete search history.

(56) References Cited

U.S. PATENT DOCUMENTS

| | | |
|---|---|---|
| 2008/0101657 A1 | 5/2008 | Durkin et al. |
| 2009/0118622 A1 | 5/2009 | Durkin et al. |
| 2009/0218527 A1 | 9/2009 | French et al. |
| 2010/0210931 A1 | 8/2010 | Cuccia et al. |
| 2016/0309068 A1 | 10/2016 | Nadeau et al. |
| 2019/0290125 A1 | 9/2019 | Amelink et al. |
| 2021/0022827 A1 | 1/2021 | Piao et al. |

FOREIGN PATENT DOCUMENTS

| | | |
|---|---|---|
| WO | 2006078973 A2 | 7/2006 |
| WO | 2017100685 A1 | 6/2017 |

OTHER PUBLICATIONS

J Angelo et al., "Real-time Endoscopic Optical Properties Imaging Using Single Snapshot of Optical Properties (SSOP) Imaging," Progress in Biomedical Optics and Imaging, vol. 9313 (2015) 93130p-93130p.

Sylvain Gioux et al., "Spatial frequency domain imaging in 2019: principles, applications, and perspectives," Journal of Biomedical Optics, vol. 24, No. 7 (2019), pp. 071613-1 to 071613-18.

Brandon S. Nichols et al., "Miniature spectral imaging device for wide-field quantitative functional imaging of the morphological landscape of breast tumor margins," Journal of Biomedical Optics, vol. 22, No. 2 (2017), pp. 026007-1 to 026007-16.

Nico Bodenschatz et al., "Diffuse optical microscopy for quantification of depth-dependent epithelial backscattering in the cervix," Journal of Biomedical Optics, vol. 21, No. 6 (2016) pp. 066001-1 to 066001-9.

Hylke Akkerman et al., "Measuring Health Parameters with Large-Area Organic Photodetector Arrays," 6-1/H. Akkerman Invited Paper, SID 2021 DIGEST, pp. 41-44.

SPATIAL FREQUENCY DOMAIN IMAGING SYSTEM AND METHOD

CROSS-REFERENCE TO RELATED APPLICATIONS

This patent application is a U.S. National Phase of PCT International Application No. PCT/NL2023/050031, filed Jan. 25, 2023, which claims priority to European Application No. 22153153.6, filed Jan. 25, 2022, which are both expressly incorporated by reference in their entireties, including any references contained therein.

TECHNICAL FIELD AND BACKGROUND

The present disclosure relates to systems and methods for spatial frequency domain imaging (SFDI).

As background, the principles of SFDI are explained in a review article by Gioux et al. [J. of Biomedical Optics, 24(7), 071613 (2019); DOI: 10.1117/1.JBO.24.7.071613]—the contents of which are incorporated herein by reference in their entirety. As explained in the article, imaging in the spatial frequency domain comprises projecting a two-dimensional (2-D) pattern of light onto a medium and analyzing the effect of multiple scattering and absorption onto the reflected or transmitted pattern's amplitude as a function of the pattern spatial frequency. For example, sinusoidal patterns are typically used to facilitate the analysis of a single-spatial frequency per projected pattern. Multiple scattering and absorption in the medium will cause a decrease in the amplitude of the projected sinewave. The reflectance image of this diffused and absorbed sinusoidal pattern is then captured by a digital camera and further processed. Amplitude modulation for every pixel of the image is calculated by a process called demodulation. Various calibration approaches can subsequently measure the optical system's frequency response or system modulation transfer function to arrive at the tissue spatial modulation transfer function, also known as the diffuse reflectance. The entire process is repeated at several spatial frequencies (at least two). Finally, using a light propagation model, optical properties are extracted for all pixels in the image. Spectral instrumentation can further extend this process to multiple wavelengths, either via serial or parallel (multiplexed) multiwavelength acquisition schemes. Due to its unique capabilities in providing fast and wide-field quantitative images of biological samples, SFDI has been rapidly evolving over the last few years with an increased interest in the field of biomedical optics. As illustrated e.g. in e.g. FIG. 4 of the aforementioned article, a typical setup for SFDI includes a light source to generate light, a spatial modulator for applying a spatial pattern to the light, a projection system for projecting the patterned light onto a tissue surface, an imaging system for imaging the resulting pattern due to reflection/scattering, and a digital camera for recording the resulting pattern.

There is yet a need to further improve known systems and methods for SFDI, e.g. to simplify the system and/or allowing more widespread application.

SUMMARY

Aspects of the present disclosure relate to system and method for spatial frequency domain imaging of a medium. As described herein, the medium is contacted with a sheet. The sheet comprise an array of lighting elements generating illumination light patterns illuminating the medium. The sheet further comprises an array of sensor elements measuring spatially resolved images of resulting light patterns reflected back after interaction of the illumination light patterns with the medium. The lighting elements are controlled to generate a set of different illumination light patterns. Each of the different illumination light patterns is spatially modulated in light intensity along a surface of the illuminated medium according to a respective different spatial frequency. Sensor signals from the sensor elements are measured to determine a set of spatially modulated images based on the measured resulting light patterns caused by the different illumination light patterns having respective different spatial frequency. One or more images of the medium can be generated based on a combination of the spatially modulated images.

It will be appreciated that the present disclosed system featuring a sheet that directly contacts and images the medium can provide various new applications for SFDI compared to the known projection based systems. For example, the contact based device can be easily placed and kept at a precise region of interest, e.g. locally applied as patch or wearable device to allow continuous monitoring of a tissue or other medium. Furthermore, by using a flexible sheet the region of interest may be substantially curved and/or variable in shape such as a body part which would get distorted or out of view using a projection based system. Furthermore, the contact based system can be substantially simplified, e.g. does not require projection optics or a spatial modulator because the lighting elements can be directly adjacent the medium. Furthermore, the contact based device can use wavelengths of light that in the projection based system, would be substantially absorbed in the air between the imaging system and the medium.

Advantageously, by using a collimating structure (preferably formed by a thin sheet) between the lighting elements and the contact surface, the projected light pattern onto the medium can be more precisely controlled. For example, this may alleviate blurring of the illumination pattern, e.g. in case the lighting elements are multidirectional or diffuse (such as typical LED). Furthermore, this may alleviate blurring even if the lighting elements are at some distance behind the contact surface and/or if there is a some spacing between imaged parts of the medium and the contact surface of the device. As will be appreciated, precise control over the illumination pattern is particularly beneficial for the present application which may rely on the precise measurement of a resulting light pattern, e.g. due to scattering in the medium, as function of the controlled illumination pattern.

By placing the sensor elements in front of the lighting elements, e.g. close to or at the contact surface, the resulting light pattern can be precisely measured. For example, source light of the lighting elements can pass between and from behind the sensor elements and resulting light can be reflected back from the medium to the front of the sensor elements (impinging the sensor surface). Furthermore, by also placing the sensor elements in front of the aforementioned collimating structure, substantially all light emitted from the medium to be directly measured. In principle, the sensor elements can also be placed behind the collimating structure, e.g. adjacent the lighting elements. However this may reduce light intensity of the resulting light pattern, which may already be relatively faint due to absorption in the medium and which may be multidirectional due to scattering in the medium (thus hardly passing back through the collimator). So preferably the collimator is arranged between the lighting elements (behind the collimator) and the sensor elements (in front of the collimator).

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
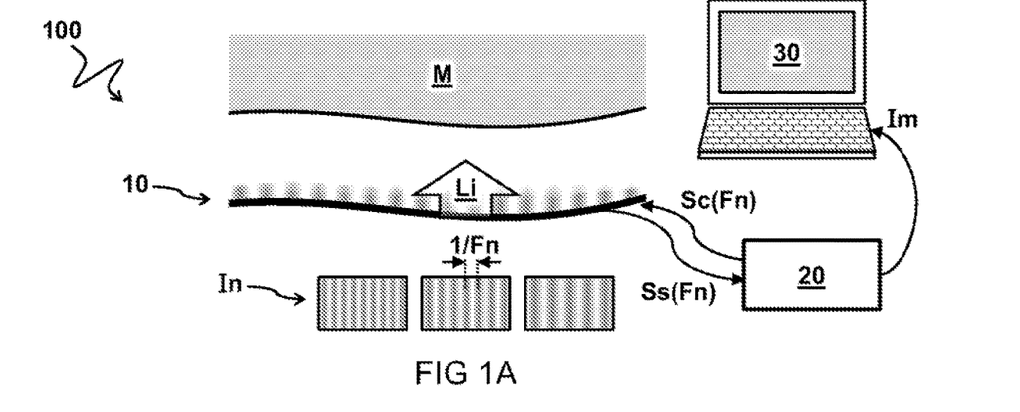
FIGS. 1A-1C illustrate various levels of detail of a contact-based SFDI system and method.
Figure 1B:
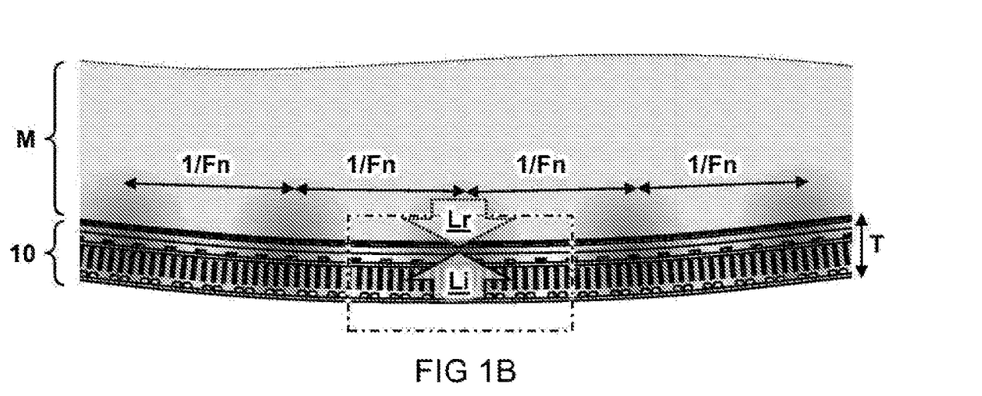
Figure 1C:
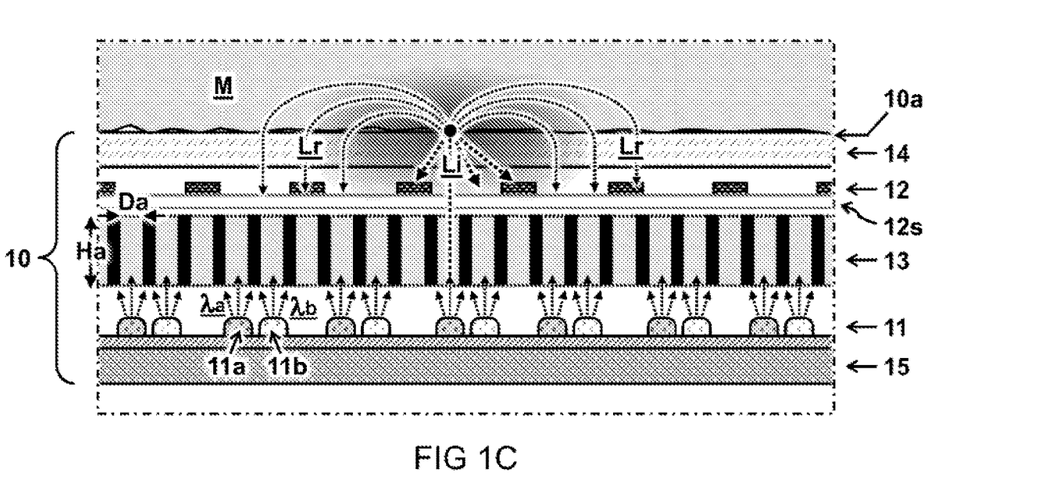

FIGS. 1A-1C illustrate various level of detail of a contact-based SFDI system and method. FIG. 1A illustrates the SFDI system 100 comprising a sheet 10 for contacting a medium "M" to be image; and a controller 20 for sending control signals "Sc" to the sheet 10 and/or receiving sensor signals "Ss" from the sheet 10. While shown here as separate components, the controller 20 can also be partially or wholly integrated as part of the sheet 10. In some embodiments, the controller 20 comprises or accesses a (non-transitory) computer-readable medium storing instructions that, when executed, e.g. by one or more processors, cause the controller to perform operational acts as described herein.

As referred herein, the sheet 10 is understood as a relatively thin structure. In some embodiments, e.g. as illustrated in FIG. 1B, the sheet 10 has a thickness "T" less than five centimeter, less than three centimeter, less than two centimeter, less than one centimeter, e.g. down to half a centimeter, down to one millimeter, or even less. In other or further embodiments, the thickness "T" of the sheet is smaller than a maximum length and/or width along a surface of the sheet, e.g. smaller by at least a factor ten, twenty, fifty, hundred or more. For example, the sheet has a length and/or width more than one centimeter, more than two centimeter, more than five centimeter, more than ten centimeter, e.g. up to fifty or hundred centimeter, or more.

In a preferred embodiment, e.g. as shown in FIGS. 1A and 1B, the sheet 10 is flexible, e.g. capable of bending down to an allowable radius without losing essential functionality (e.g. without breaking electrical connections, components, or material layers, and/or without essentially losing electrical and optical performance). Preferably, the allowed bending radius is than one meter, less than half a meter, less than twenty centimeter, less than ten centimeter, less than five centimeter, e.g. down to one centimeter, or even less. The smaller the bending radius can be, the more capable the device may be to provide various applications such as conforming to a non-planar medium.

Typically, as e.g. illustrated in FIG. 1C, the sheet 10 has a contact surface 10a for contacting a medium "M" to be imaged. In some embodiments, the sheet comprises an array of lighting elements 11, preferably a two-dimensional array. For example, the lighting elements 11 are disposed inside the sheet 10. In one embodiment, the lighting elements 11 are configured to generate a controllable illumination light pattern "Li". For example, illumination light pattern "Li" emanates from the contact surface 10a. In this way the, illumination light pattern "Li" may illuminate the medium "M", e.g. as it is contacted by the sheet 10 or at least in close proximity to the sheet 10. In other or further embodiments, the sheet comprises an array of sensor elements 12, preferably a two-dimensional array. For example, the sensor elements 12 are disposed inside the sheet 10. In one embodiment, the sensor elements 12 are configured to measure a spatially resolved image of a resulting light pattern "Lr". For example, resulting light pattern comprises light directly or indirectly reflected back to the contact surface 10a after interaction of the illumination light pattern "Li" with the medium "M".

In some embodiments, the controller 20 is configured to control the lighting elements 11 to generate a set of different illumination light patterns "Li". For example, the different illumination light patterns "Li" are generated using respective control signals "Sc", In one embodiment, each of the different illumination light patterns "Li" is spatially modulated in light intensity along the contact surface 10a according to a respective different spatial frequency "Fn". In other or further embodiments, the controller 20 is configured to determine a set of spatially modulated images "In" based on the measured resulting light patterns "Lr" caused by the different illumination light patterns "Li" having respective different spatial frequency "Fn". For example, the spatially modulated images "In" are determined by processing sensor signals "Ss" from the sensor elements 12. In some embodiments, the controller 20 is configured to generate an image "Im" of the medium "M" based on a combination of the spatially modulated images "In". For example, the image "Im" can be sent to an integrated or separate computing device 30 and/or display configured to show a representation of the image "Im", e.g. to a user. Alternatively, or additionally, the spatially modulated images "In" and/or the image "Im" can be stored for later processing by the controller 20 and/or separate computing device 30.

In principle, after the data is taken by the contact based imaging device as presently disclosed, the data can be processed and images of the tissue can be generated similarly as in the known SFDI systems that rely on distant image projection. For example, an amplitude modulation for every pixel of the image can be calculated by demodulation of the spatially modulated images. Also other ways of processing the data can be envisaged.

In a preferred embodiment, the sheet 10 comprises a collimating structure 13 between the lighting elements 11 and the contact surface 10a. A collimating structure can be used for filtering light rays, so that only those rays traveling parallel or nearly parallel to a specified direction are allowed through. This can be advantageous for applications as described herein to increase the resolution or sharpness of an image projected by a light source through the collimator onto a close-by medium and/or of a resulting image if it is projected back through the collimator onto sensor elements behind.

In generally, a main direction in which light rays are allowed through the collimator can be referred to as the principal transmission direction. The collimator may selectively transmit light there through depending on an angle of incidence of the incident light with respect to the principal transmission direction. In a preferred embodiment, the principal transmission direction of the collimator is aligned with a normal vector of the collimator surface which is typically parallel to the contact surface 10a of the sheet 10. This means only light at normal or near-normal angle of incidence is transmitted through the collimator while light at higher angles is blocked. For example, the collimator may transmit only light at angles of incidence less than ten degrees plane angle, less than five degrees, less than two degrees, or even less than one degree with respect to the principal transmission direction. The smaller the threshold angle, the better the light is collimated however this may be at the cost of blocking more non-collimated light. Light at higher angles of incidence is preferably absorbed by the collimator material e.g. inside (micro) apertures or holes through the collimator.

In a preferred embodiment, the collimating structure 13 comprises a (flexible) collimator sheet, e.g. relatively thin or sheet-like structure having (micro) apertures configured to predominantly pass light having a direction transverse to the sheet surface. In one embodiment, the collimator sheet has a thickness "Ha" of less than half a centimeter, preferably less than two millimeter, most preferably less than one millimeter, e.g. down to hundred micrometer, or less. Typically, the apertures through the collimator can be dimensioned to define the threshold angle. For example, the apertures have a (maximum or average) aperture diameter transverse to the principal transmission direction and a (minimum or average) aperture length along the principal transmission direction. For example, the threshold angle may be defined as the inverse tangent function ($\tan^{-1}$) of the aperture diameter "Da" divided by the aperture length or height "Ha", i.e. $\tan(\theta max)=Da/Ha$. For example, a threshold angle θmax of less than ten degrees may be achieved with an aspect ratio of Da/Ha<0.17, i.e. tan (10) or less than about 1:5. For example, a threshold angle θmax of less than five degrees may be achieved with an aspect ratio of Da/Ha<0.087, i.e. tan (5) or less than about 1:10. For example, a threshold angle θmax of less than one degree may be achieved with an aspect ratio of Da/Ha<0.017, i.e. tan (1) or less than about 1:50. The lower the aspect ratio Da/Ha, the more collimated the filtered light. For example, the apertures may be micro-apertures have a cross-section diameter "Da" between 0.1-20 μm, preferably between one and ten micrometer. At the same time, the micro-apertures may e.g. have a length or height "Ha" of at least ten micrometer, preferably at least fifty or at least hundred micrometer, or more, e.g. up to one or even several millimeters.

Preferably, the walls surrounding (micro) apertures through the collimator have a relatively high light absorption, at least inside the apertures, e.g. absorbing more than 90% of the used light of the lighting elements 11 falling onto the walls, preferably more than 99%. For example, the walls can be formed of carbon nanotubes (CNT) as previously disclosed in the publication WO 2019/172763 A1. Also other ways of manufacturing a collimator structure can be used such as molding, cutting holes, lithographic techniques, et cetera. In some embodiments, absorbing particles such as carbon can be mixed in the collimator material to increase absorption at the walls. For example, visible or infrared light may be used. By absorbing most or all of the light, it can be prevented that non-collimated light hitting the wall material of the collimator can still pass the aperture e.g. by reflection. Advantageously the use of a collimator in front of the lighting elements 11 may allow the use of various light sources, even having a relatively diffuse and/or wide angle emission, while still maintaining a well-controlled illumination pattern. In one embodiment, the lighting elements 11 are formed by light emitting diodes, e.g. LED or OLED.

In a preferred embodiment, the collimating structure 13 is arranged between the lighting elements 11 and the sensor elements 12. Most preferably, the sensor elements 12 are arranged in front of the collimating structure 13, e.g. between the collimating structure 13 and the contact surface 10a, while the lighting elements 11 are arranged behind the collimating structure 13, e.g. between the collimating structure 13 and back surface layer of the sheet 10. Preferably, each of the lighting elements 11, sensor elements 12 and collimating structure 13 are arranged inside the sheet 10. Accordingly each of these elements or structures is preferably flexible and/or bendable like the sheet and/or sufficiently thin.

In some embodiments, the lighting elements 11 are arranged according to a first pattern and the sensor elements 12 are arranged according to a second pattern that is complementary to the first pattern. In other words, the sensor elements 12 (exclusively) arranged at positions of gaps between the lighting elements 11 and/or the lighting elements 11 are (exclusively) arranged at positions of gaps between the sensor elements 12. In one embodiment, using a collimating structure 13 arranged between the lighting elements 11 and sensor elements 12, the sensor elements 12 are disposed at the gaps between the lighting elements 11 at the other side of the collimator, and/or vice versa. In this way light from the lighting elements 11 can pass through the collimating structure 13 between the sensor elements 12. Alternatively, the sensor elements 12 could be arranged behind the collimating structure 13, e.g. on a separate substrate or on the same substrate interspersed between the lighting elements 11. For example, the collimating structure 13 covers both the lighting elements 11 and sensor elements 12, preferably in such a way so as to prevent light from the lighting elements 11 reaching the adjacent sensor elements 12 unless it passes (twice) through the collimating structure 13.

In some embodiments, the sensor elements 12 are arranged on a transparent substrate between the lighting elements 11 and the contact surface 10a, i.e. transparent at least to the illumination light pattern "Li", e.g. transmitting more than 80%, more than 90%, more than 95%, up to 99%, or more. Preferably, the substrate comprises electronics and/or wiring to read out individual and/or combined sensor elements 12. For example, the electronics and/or wiring is relatively thin and/or transparent and/or arranged according to the second pattern to still allows sufficient light of the lighting elements 11 to pass through. Alternatively to placing the sensor elements 12 on a separate transparent substrate, it can also be envisaged to place the sensor elements 12 and/or wiring/electronics directly on the collimating structure 13 (not shown here).

In some embodiments, the contact surface 10a is formed by a front substrate 14 that is transparent to the illumination light pattern "Li" and resulting light pattern "Lr", e.g. transmitting more than 80%, more than 90%, more than 95%, up to 99%, or more. In one embodiment, the front substrate 14 is arranged in front of the sensor elements 12. In another or further embodiment, the front substrate 14 has a thickness of less than half a centimeter, preferably less than two millimeter, most preferably less than one millimeter. The thinner the front substrate 14, the more precise the resulting light pattern "Lr" can be measured. For example, the sensor elements 12 can be arranged directly behind the front substrate 14 which can shield the sensor elements 12 from damage. Alternatively to using a front substrate 14, the sensor elements 12 can be part of the front substrate 14, e.g. arranged to directly contact the medium "M" (not shown here).

In some embodiments, the lighting elements 11 are arranged on a substrate. Preferably, the substrate also comprises electronics and/or wiring to control individual and/or combined lighting elements 11. In one embodiment, e.g. as shown, the sheet 10 comprises a back layer substrate 15, e.g. to protect the lighting elements 11 and/or back electronics. Alternatively to using a separate back layer substrate 15, the backside of a substrate housing the lighting elements 11 can form the back surface layer of the sheet 10.

In some embodiments, the array of lighting elements 11 is configured to emit respective light patterns with a controllable wavelength of light, e.g. capable of emitting at least two different wavelengths $\lambda a$, $\lambda b$. In one embodiment, the array of lighting elements 11 comprises a first set of lighting elements 11a configured to emit a first wavelength of light $\lambda a$, and a second set of lighting elements 11b configured to emit a second wavelength of light $\lambda b$ that is distinct from the first wavelength of light $\lambda a$. For example, the array of lighting elements 11 comprises two, three, or more different lighting devices, e.g. LEDs or OLEDs having different color. By using different wavelengths, further (spectrally resolved) information about the medium can be measured. For example, the transmission, absorption, scattering, and/or reflection characteristics of light interacting with the medium and/or its substructures can be measured and/or compared at two or more different wavelengths. For example, the image may include spectral information of the medium, e.g. biological tissue. In some embodiments, a central or average wavelengths of light emitted by one or more the lighting elements 11 includes an infrared wavelength between 780 and 1 mm, e.g. IR-A (780 nm-1.4 μm), IR-B (1.4-3 μm) and/or IR-C, also known as far-IR (3 μm-1 mm). Advantageously, the infrared wavelengths can be used to probe various aspects of biological tissue. Also other or further wavelength of light can be used such as visible light or even UV light.

In some embodiments, the controller 20 is configured to control the first set of lighting elements 11a to generate a first set of different illumination light patterns at the first wavelength of light $\lambda a$ and to control a second set of lighting elements 11b to generate a second set of different illumination light patterns at the second wavelength of light $\lambda b$. Preferably, the first set of different illumination light patterns has the same respectively spatial modulation as the second set of different illumination light patterns. In this way, a comparison can be made of the resulting patterns wherein only the wavelength of the illumination is different. Alternatively, the spatial modulation can be different between the sets of different wavelengths.

In some embodiments, the controller 20 is configured to control a first set of lighting elements 11a to generate a first set of different illumination light patterns during a first time interval, and process first sensor signals from the sensor elements to determine a first set of spatially modulated images based on the measured resulting light patterns caused by the different illumination light patterns at the first wavelength of light $\lambda a$. In other or further embodiments, the controller 20 is configured to control the second set of lighting elements 11b to generate the second set of different illumination light patterns during a second time interval, and process second sensor signals from the sensor elements to determine a second set of spatially modulated images based on the measured resulting light patterns caused by the different illumination light patterns at the second wavelength of light $\lambda b$. In other or further embodiments, the controller 20 is configured to generate one or more images "Im" of the medium based on a combination of the spatially modulated images "In" at the first and second wavelengths of light $\lambda a$, $\lambda b$. Preferably, the respective patterns at different wavelengths are generated sequentially, i.e. the second time interval is non-overlapping with the first time interval. In this way, it is easier to use the same sensor elements while distinguishing different wavelengths based on the time interval. Alternatively, illumination at different wavelengths can be performed simultaneously, e.g. using a spectral filter and/or sensor elements sensitive to respective wavelengths.

According to some aspects, the present teachings can be embodied as a wearable device comprising the SFDI system as described herein, e.g. having the sheet 10 configured to be worn contacting part of a subject's body for monitoring underlying biological tissue. For example, the wearable device comprises attachment means such as straps or sticky material (e.g. patch) to wear the sheet on the body. The wearable part of the device includes the sheet and may also include the controller 20, or the controller can be provided separately, e.g. running on a mobile device communicatively coupled to the wearable part via a wireless or wired connection.

According to other or further aspects, the present teachings may relate to use of the SFDI system and/or be embodiments related to methods for contact-based SFDI of a medium "M". Some embodiment comprise contacting the medium "M" with a sheet 10 comprising an array of lighting elements 11 generating illumination light patterns "Li" illuminating the medium "M", and an array of sensor elements 12 measuring spatially resolved images of resulting light patterns "Lr" reflected back after interaction of the illumination light patterns "Li" with the medium "M". Other or further embodiments comprise controlling the lighting elements 11 to generate a set of different illumination light patterns "Li", wherein each of the different illumination light patterns "Li" is spatially modulated in light intensity along a surface of the illuminated medium "M" according to a respective different spatial frequency "Fn". Other or further embodiments comprise processing sensor signals "Ss" from the sensor elements 12 to determine a set of spatially modulated images "In" based on the measured resulting light patterns "Lr" caused by the different illumination light patterns "Li" having respective different spatial frequency "Fn". Other or further embodiments comprise generating an image "Im" of the medium "M" based on a combination of the spatially modulated images "In".

In some embodiments, the medium "M" comprises a biological tissue and the image includes spectral information about biologically relevant information, such as tissue composition, oxygenation, et cetera. For example, by measuring a combination of light at different wavelengths, a spectral signature of the respective tissue can be determined. It is also possible to calculate an oxygenation of the tissue, e.g. using a ratio of measured spectral values indicated for oxygenated or non-oxygenated hemoglobin.

FIGS. 2A-2D each illustrates an example of a respective set of different illumination light patterns "Li". The respective light and dark colors indicate the light intensity at a respective location. As illustrated, each of the different illumination light patterns "Li" is spatially modulated in light intensity along at least one surface coordinate X,Y,R according to a respective different spatial frequency F1,F2, F3. In some embodiments, e.g. as shown here, the illumination light patterns comprise gradual transitions of light intensity between the dark and light stripes. For example, this may be achieved by controlling the lighting devices to generate a set of different light intensities, e.g. according to sinusoidal or other light intensity variation. In other or further embodiments (not shown here) the transition between high and low intensity can be abrupt or even binary. For example, a respective light pattern can be formed by lighting devices being on or off, e.g. along a respective row, or column, or other pattern.

In a preferred embodiment, each illumination light pattern comprises a set of (gradual or abrupt transitioning) stripes with alternating high and low light intensity, wherein the light intensities recur along at least one spatial coordinate with a respective spatial period according to the respective spatial frequency "Fn" of the illumination light pattern. For example, the spatial frequency is reciprocal to the spatial period (Pn=1/Fn). Preferably, the spatial period or frequency has a fixed value for a respective light pattern, e.g. the stripe patterns has multiple recurrences at a regular or fixed spatial interval. In principle, it may be sufficient to use only two different spatial frequencies (F1,F2), although preferably more spatial frequencies are used, e.g. at least three, four, five, up to ten, or more. Preferably, the set of different spatial frequencies (F1,F2,F3) is equally spaced in frequency or equally spaced in period (reciprocal frequency).

Figure 2A:
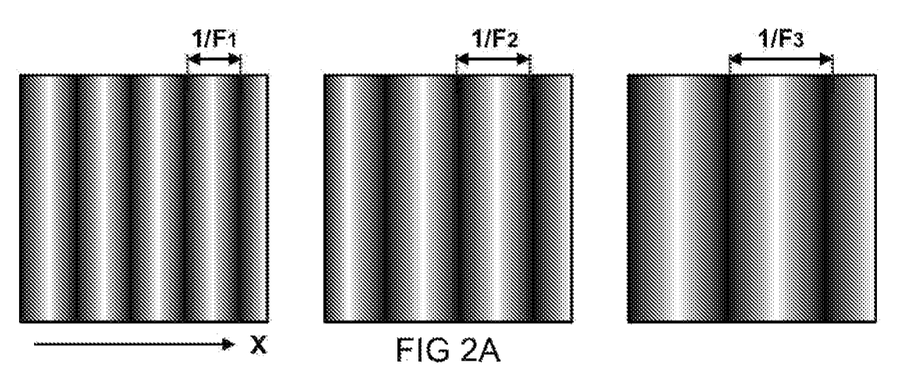
FIGS. 2A-2D each illustrates a respective set of different illumination light patterns for SFDI.
Figure 2B:
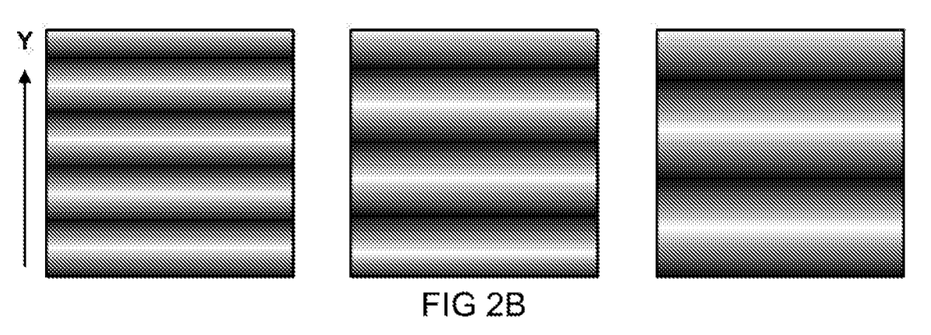
Figure 2C:
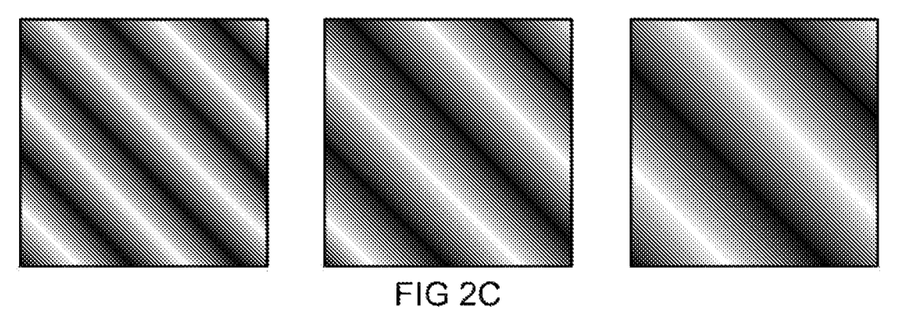
Figure 2D:
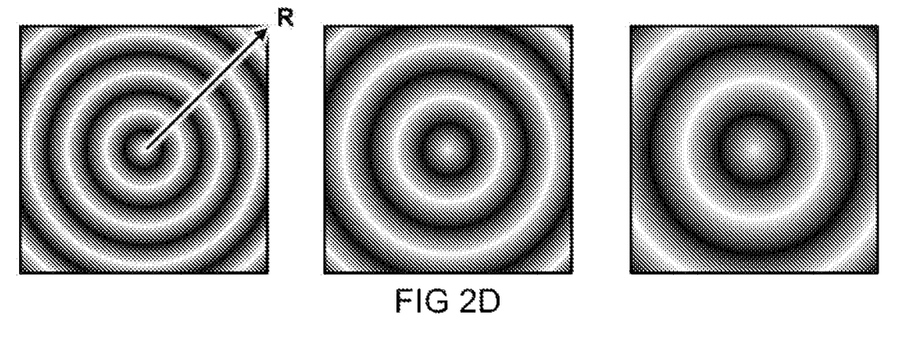

In some embodiments, such as illustrated in FIGS. 2A-2C the illumination light patterns comprises horizontal, vertical, and/or diagonal stripes. In other or further embodiments, also other spatially recurring patterns can be used such at the circular patterns with different spatial frequency illustrated in FIG. 2D. Also combinations of different oriented light patterns and/or different types of light patterns can be used.

In one embodiment, the array of lighting elements 11 is controlled to generate a first set of different illumination light patterns during a first time interval, and process first sensor signals from the sensor elements to determine a first set of spatially modulated images based on the measured resulting light patterns caused by first set of different illumination light patterns, wherein the first set of different illumination light patterns comprise a pattern of stripes with alternating light intensity directed along a first surface coordinate X. In another or further embodiment, the array of lighting elements 11 is controlled to generate a second set of different illumination light patterns during a second time interval, and process second sensor signals from the sensor elements to determine a second set of spatially modulated images based on the measured resulting light patterns caused by second set of different illumination light patterns. For example, the second set of different illumination light patterns comprise a pattern of stripes with alternating light intensity directed along a second surface coordinate Y that is at a non-zero angle with respect to the first surface coordinate X. In some embodiments, an image "Im" of the medium "M" is generated based on a combination of the first and second sets of spatially modulated images at the different orientations.

Preferably, the different orientations of the first and second surface coordinates are transverse, e.g. perpendicular to each other as shown in FIGS. 2A and 2B. Also other or further orientations can be used, e.g. 45° such as shown in FIG. 2C. For example, a measurement may include rotating the pattern at various angles to alleviate or enhance anisotropic scattering behavior of the medium in a combined one or more images. Light patterns with different orientations and/or different types of light patterns can also be combined with different wavelengths, e.g. using the same varying pattern at two or more different wavelengths or using different variations at different wavelengths. For example, it can be envisaged to use a first set of patterns at a first orientation with a first wavelength while second set of patterns with a different, e.g. transverse or perpendicular, orientation has a second wavelength.

Figure 3A:
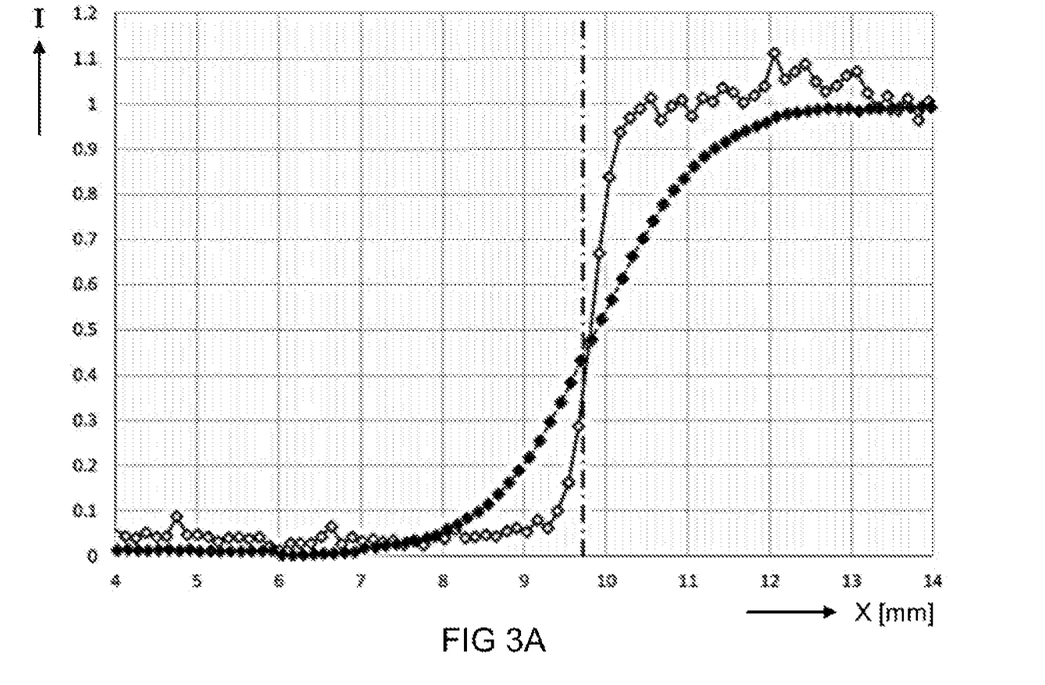
FIGS. 3A and 3B illustrate measurements using a contact-based SFDI system and method as described herein.
Figure 3B:
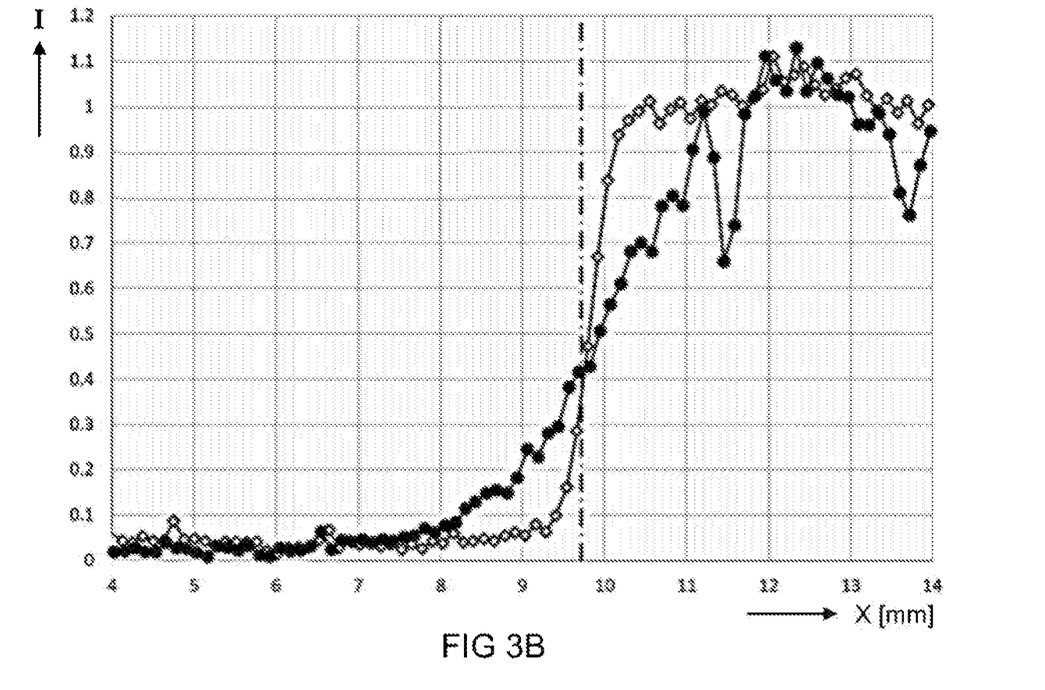

FIGS. 3A and 3B illustrate measurements using a contact-based SFDI system and method as described herein. The horizontal axis indicates a position along a surface coordinated "X" (in millimeters) wherein light is measured by respective sensor elements. The vertical axis indicated relative (normalized) light intensity "I". The dash-dotted line indicates a transition where the respective lighting elements were turned OFF (left of the line) or ON (right of the line).

In FIG. 3A, a comparison is shown of the system contacting a mirror surface. The graph with open dots shows a measurement of a system including a collimator present between the lighting elements and the mirror, while the graph with closed dots illustrates a measurement of the same device without the collimator. From comparison of the two graphs it will be appreciated that the collimator provides a substantial improvement in maintaining a clear transition between the illuminated and non-illuminated parts of the mirror, whereas this transition is smeared out in the absence of the collimator e.g. due to the diffuse nature of the light sources (the mirror itself hardly diffuses the light).

In FIG. 3B, a comparison is shown of the same system including a collimator either contacting the mirror surface (open dots) or a tissue surface (closed dots). From comparison of the two graphs it will be appreciated that, compared to the mirror surface, the tissue has substantially higher scattering behavior causing light to scattered to further adjacent regions which were not directly illuminated. This may include light directly scattered from a surface of the medium as well as light penetrating the medium. For example, this may depend on the wavelength of the light being more or less transmissible through the medium. In some embodiments, the resulting pattern measured from a mirror surface is used to calibrate the SFDI system, e.g. used to determine an actual or assumed illumination light pattern "Li" illuminating the medium "M", and/or compared to a resulting light pattern "Lr" from the medium "M" to be imaged.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A spatial frequency domain imaging, SFDI, system comprising:
    a sheet having a contact surface for contacting a medium to be imaged, the sheet comprising:
        an array of lighting elements configured to generate a controllable illumination light pattern emanating from the contact surface for illuminating the medium contacted by the sheet, and
        an array of sensor elements configured to measure a spatially resolved image of a resulting light pattern reflected back to the contact surface after interaction of the illumination light pattern with the medium; and
    a controller configured to:
        control the lighting elements to generate a set of different illumination light patterns, wherein each of the different illumination light patterns is spatially modulated in light intensity along the contact surface according to a respective different spatial frequency,
        determine, based on measurements by the sensor elements, a set of spatially modulated images representing the resulting light patterns caused by the different illumination light patterns having respective different spatial frequency, and
        generate an image of the medium based on a combination of the spatially modulated images.

2. The system according to claim 1, wherein the sheet is flexible and capable of bending to a radius of less than twenty centimeter without losing essential functionality.

3. The system according to claim 1, wherein the sheet has a total thickness of less than one centimeter.

4. The system according to claim 1, wherein the sheet comprises a collimating structure between the lighting elements and the contact surface.

5. The system according to claim 4, wherein the collimating structure comprises a flexible collimator sheet having:
    a thickness of less than one millimeter, and
    a set of micro-apertures configured to exclusively pass light of the lighting elements with an angle of incidence less than ten degrees from a normal vector of the contact surface.

6. The system according to claim 5, wherein the collimating structure is between the lighting elements and the sensor elements.

7. The system according to claim 6, wherein the lighting elements are arranged according to a first pattern, wherein the sensor elements are arranged according to a second pattern that is complementary to the first pattern, wherein the sensor elements are disposed at respective gaps between the lighting elements at an opposite side of the collimator structure, and wherein the lighting elements are disposed at respective gaps between the sensor elements at the opposite side of the collimator structure.

8. The system according to claim 1, wherein the sensor elements are arranged on a transparent substrate between the lighting elements and the contact surface.

9. The system according to claim 1, wherein the contact surface is formed by a front substrate that is transparent to the illumination light pattern and resulting light pattern, wherein the front substrate is arranged in front of the sensor elements, and wherein the front substrate has a thickness of less than one millimeter.

10. The system according to claim 1, wherein the array of lighting elements comprises:
    a first set of lighting elements configured to emit a first wavelength of light, and
    a second set of lighting elements configured to emit a second wavelength of light that is distinct from the first wavelength of light;
    wherein the controller is configured to:
    control the first set of lighting elements to generate a first set of different illumination light patterns at the first wavelength of light, and
    control the second set of lighting elements to generate a second set of different illumination light patterns at the second wavelength of light.

11. The system according to claim 10, wherein the controller is configured to:
    control the first set of lighting elements to generate the first set of different illumination light patterns during a first time interval, and process first sensor signals from the sensor elements to determine a first set of spatially modulated images based on the measured resulting light patterns caused by the different illumination light patterns at the first wavelength of light;
    control the second set of lighting elements to generate the second set of different illumination light patterns during a second time interval, and process second sensor signals from the sensor elements to determine a second set of spatially modulated images based on the measured resulting light patterns caused by the different illumination light patterns at the second wavelength of light; and
    generate one image of the medium based on a combination of the spatially modulated images at the first wavelength of light and the second wavelength of light.

12. The system according to claim 1, wherein each illumination light pattern comprises a set of stripes with alternating high and low light intensity, and wherein the alternating light intensities recur multiple times along at least one spatial coordinate of the contact surface with a respective spatial frequency of the illumination light pattern.

13. The system according to claim 1, wherein the lighting elements are formed by a two-dimensional array of light emitting diodes, wherein each diode of the two dimensional array has controllable light intensity.

14. The system according to claim 1, wherein the sheet is configured to be worn contacting part of a subject's body for monitoring underlying biological tissue.

15. A method for contact-based SFDI of a medium, the method comprising:
- contacting the medium with a sheet comprising:
  - an array of lighting elements generating illumination light patterns illuminating the medium, and
  - an array of sensor elements measuring spatially resolved images of resulting light patterns reflected back after interaction of the illumination light patterns with the medium;
- controlling the lighting elements to generate a set of different illumination light patterns, wherein each one of the set of the different illumination light patterns is spatially modulated in light intensity along a surface of the illuminated medium according to a respective different spatial frequency;
- processing sensor signals from the sensor elements to determine a set of spatially modulated images based on the measured resulting light patterns caused by the different illumination light patterns having respective different spatial frequency; and
- generating an image of the medium based on a combination of the spatially modulated images.

16. The method according to claim 15, wherein the sheet is flexible and capable of bending to a radius of less than twenty centimeter without losing essential functionality.

17. The method according to claim 15, wherein the sheet comprises a collimating structure between the lighting elements and the contact surface.

18. The method according to claim 17, wherein the collimating structure comprises a flexible collimator sheet having:
- a thickness of less than one millimeter, and
- a set of micro-apertures configured to exclusively pass light of the lighting elements with an angle of incidence less than ten degrees from a normal vector of the contact surface.

19. The method according to claim 18, wherein the collimating structure is arranged between the lighting elements and the sensor elements.

20. The method according to claim 19, wherein the lighting elements are arranged according to a first pattern, wherein the sensor elements are arranged according to a second pattern that is complementary to the first pattern, wherein the sensor elements are disposed at respective gaps between the lighting elements at an opposite side of the collimator structure, and wherein the lighting elements are disposed at respective gaps between the sensor elements at the opposite side of the collimator structure.

* * * * *